W. J. ANDREWS.
Improvement in Track-Clearers for Mowing-Machines.
No. 128,453. Patented July 2, 1872.
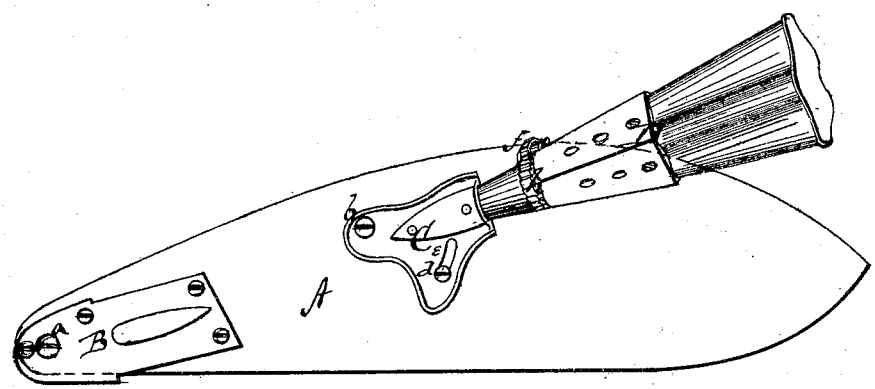

128,453

UNITED STATES PATENT OFFICE.

WILLIAM J. ANDREWS, OF COLUMBIA, TENNESSEE.

IMPROVEMENT IN TRACK-CLEARERS FOR MOWING-MACHINES.

Specification forming part of Letters Patent No. 128,453, dated July 2, 1872.

SPECIFICATION.

*To all whom it may concern:*

Be it known that I, WM. J. ANDREWS, of Columbia, in the county of Maury and State of Tennessee, have invented certain new and useful Improvements in Track-Board Dividers; and I do hereby declare that the following is a full, clear, and exact description thereof, reference being had to the accompanying drawing and to the letters of reference marked thereon which form a part of this specification.

The nature of my invention consists in the construction and arrangement of a track-divider or track-clearer, as will be hereinafter more fully set forth.

In order to enable others skilled in the art to which my invention appertains to make and use the same, I will now proceed to describe its construction and operation, referring to the annexed drawing, which represents a perspective view of my track-divider or clearer.

A represents the track-board provided at its front end with a plate, B, through which a bolt, a, passes to secure the board to the mower-shoe, the board running upon the ground. C is a socket pivoted to the board A at b and provided with a curved slot, e, through which a bolt, d, passes into the board, so that a rod inserted in said socket may be adjusted to any desired height. Over this rod—termed divider-rod—is slipped a corrugated cone-shaped reel, D, which is secured in any suitable manner, so as to revolve on the rod, not by its contact with the ground, as heretofore, but by the weight of the cut grass falling thereon as the mower is drawn forward, thereby leaving a clear and clean track for the next round of the machine. Should the cut grass fall between the reel and track-board the reel is prevented from revolving backward by the pawl $f$ and ratchet-wheel $h$.

Having thus fully described my invention, what I claim as new, and desire to secure by Letters Patent, is—

1. The corrugated cone-shaped reel D attached to the track-board A, and revolved solely by the weight of the cut grass falling thereon, substantially as herein set forth.

2. In combination with the reel D attached to the track-board A, and revolving solely by the weight of the cut grass falling thereon, I claim the pawl $f$ and ratchet-wheel $h$, substantially as and for the purposes herein set forth.

3. The combination, with the track-board A of the adjustable socket C, reel D, ratchet-wheel $h$, and pawl $f$, all constructed and arranged substantially as and for the purposes herein set forth.

In testimony that I claim the foregoing as my own I affix my signature in presence of two witnesses.

WM. J. ANDREWS.

Witnesses:
  J. H. DUGGER,
  W. J. DALE.